United States Patent [19]
Carlstrom, Jr. et al.

[11] Patent Number: 6,093,502
[45] Date of Patent: Jul. 25, 2000

[54] FUEL CELL WITH SELECTIVE PRESSURE VARIATION AND DYNAMIC INFLECTION

[75] Inventors: Charles M. Carlstrom, Jr., Clifton Park; William B. Maynard, Voorheesville, both of N.Y.

[73] Assignee: Plug Power Inc., Latham, N.Y.

[21] Appl. No.: 09/181,400

[22] Filed: Oct. 28, 1998

[51] Int. Cl.$^7$ ............................................. H01M 8/04
[52] U.S. Cl. ........................................ 429/25; 429/13
[58] Field of Search ........................ 429/3, 4, 13, 22, 429/25, 34, 38, 39, 44

[56] References Cited

U.S. PATENT DOCUMENTS

| | | | |
|---|---|---|---|
| 3,313,656 | 4/1967 | Blomgren et al. | 136/86 |
| 3,338,747 | 8/1967 | Plust et al. | 136/86 |
| 3,391,028 | 7/1968 | Vose . | |
| 3,476,608 | 11/1969 | Griffin, Jr. | 136/86 |
| 3,762,959 | 10/1973 | McCoy | 136/141 |
| 4,002,805 | 1/1977 | Waldman | 429/17 |
| 4,729,930 | 3/1988 | Beal et al. | 429/13 |
| 5,277,994 | 1/1994 | Sprouse | 429/17 |
| 5,346,780 | 9/1994 | Suzuki | 429/42 |
| 5,366,821 | 11/1994 | Merritt et al. | 429/21 |
| 5,441,819 | 8/1995 | Voss et al. | 429/13 |
| 5,458,989 | 10/1995 | Dodge | 429/31 |
| 5,635,039 | 6/1997 | Cisar et al. | 204/252 |
| 5,645,950 | 7/1997 | Benz et al. | 429/13 |

FOREIGN PATENT DOCUMENTS 934416   8/1963   United Kingdom .

OTHER PUBLICATIONS

J.H. Hirschenhofer, D.B. Stauffer, and R.R. Engelman, Fuel cells A Handbook (Revision 3), Jan., 1994, pp. 2–1 to 2–8, U.S. Department of energy, DOE/METC–94/1006 (DE94004072).

*Primary Examiner*—Stephen Kalafut
*Assistant Examiner*—Susy Tsang
*Attorney, Agent, or Firm*—Heslin & Rothenberg, P.C.

[57] ABSTRACT

In one aspect, a fuel cell assembly may include one or more (e.g., PEM-type) fuel cell(s). Fluid(s) service(s) for the fuel cell assembly may include reactant fluid(s) service(s) such as service(s) of fuel(s) and/or oxidant(s), along with humidification service(s). A pulsator may be positioned at any entrance and/or exit for the fluid manifolds. Such pulsator(s) may serve to introduce pressure variation(s) along part(s) of flow path(s) extending in the fuel cell assembly. In one example, with respect to an anode side of a fuel cell, the pressure variation(s) may serve to purge a nitrogen blanket from the anode side of the MEA so reformate including hydrogen may be supplied for electrochemical reaction. With respect to a cathode side of the fuel cell, the pressure variation(s) may serve to remove a nitrogen and/or carbon dioxide blanket and product fluid from the cathode side of the MEA so air containing oxygen may be supplied for the electrochemical reaction. Also, excess humidification fluid may be removed. A greater power density may be obtained. Pressure variation(s) may be configured to dynamically inflect the MEA to assist mechanical mixing(s) in promoting flow field fuel service(s) and/or increasing power density.

22 Claims, 11 Drawing Sheets

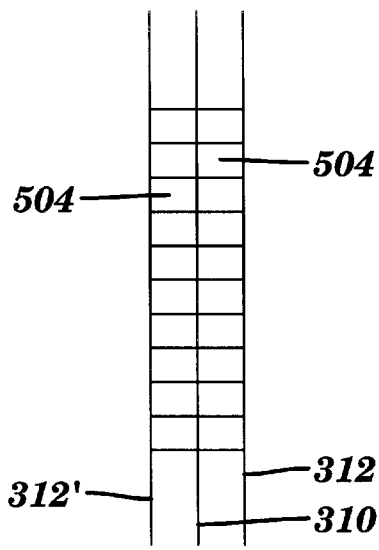
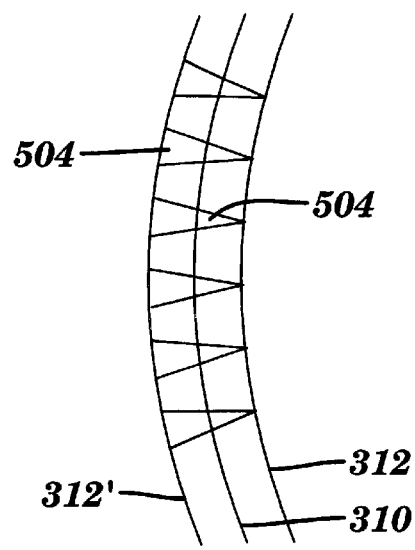
FIG. 7  FIG. 8
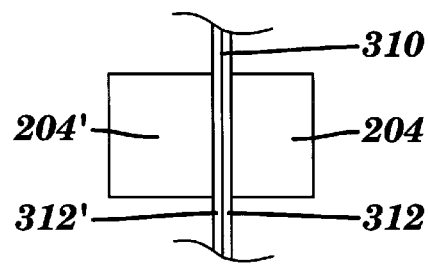
FIG. 9
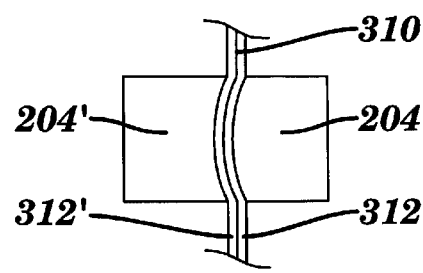
FIG. 10

FUEL CELL WITH SELECTIVE PRESSURE VARIATION AND DYNAMIC INFLECTION

TECHNICAL FIELD

This invention relates, generally, to fuel cell assemblies and, more particularly, to flow field fluid service as well as power density of fuel cell assemblies.

BACKGROUND ART

Fuel cells electrochemically convert fuels and oxidants to electricity, and fuel cells can be categorized according to the type of electrolyte (e.g., solid oxide, molten carbonate, alkaline, phosphoric acid, or solid polymer) used to accommodate ion transfer during operation. Moreover, fuel cell assemblies can be employed in many environments, for multiple applications.

A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). Some artisans consider the acronym "PEM" to represent "Polymer Electrolyte Membrane." The direction, from anode to cathode, of flow of protons serves as a basis for labeling an "anode" side and a "cathode" side of every layer in the fuel cell, and in the fuel cell assembly or stack.

Usually, an individual PEM-type fuel cell has multiple, generally transversely extending layers assembled in a longitudinal direction. In the typical fuel cell assembly or stack, all layers which extend to the periphery of the fuel cells have holes therethrough for alignment and formation of fluid manifolds that generally service fluids for the stack. As is known in the art, some of the fluid manifolds distribute fuel (e.g., hydrogen) and oxidant (e.g., air/oxygen) to, and remove unused fuel and oxidant as well as product water from, fluid flow plates which serve as flow field plates for each fuel cell. Also, other fluid manifolds circulate coolant (e.g., water) for cooling.

As is known in the art, the PEM can work more effectively if it is wet. Conversely, once any area of the PEM dries out, the fuel cell does not generate any product water in that area because the electrochemical reaction there stops. Undesirable, this drying out can progressively march across the PEM until the fuel cell fails completely. So, the fuel and oxidant fed to each fuel cell are usually humidified.

However, an overabundance of water in the fuel cell may impede delivery and removal of gases for the PEM. It is therefore desirable that excess product water and/or excess humidification water be carried away from the PEM.

Furthermore, the fuel cell may experience reactant starvation when gases besides the reactant gases are supplied to the fuel cell. With respect to the cathode side of the fuel cell, one may choose to use air rather than pure oxygen for reasons such as increased availability and/or decreased combustibility. When air is supplied as the oxidant source, the oxygen is consumed in the electrochemical reaction. But, other components of the air, such as inert gases (e.g., nitrogen and/or carbon dioxide), may linger near the PEM. Undesirably, the inert gases may impede supply of oxygen to the PEM. Such a condition may be referred to as "nitrogen blanketing" and/or "carbon dioxide blanketing."

With respect to the anode side of the fuel cell, one may wish to use propane as an original source of fuel rather than pure hydrogen, since propane may be more readily available. The propane may be passed through a reformer, the output of which may be referred to as "reformate." The reformate includes hydrogen as well as extra, undesired gases such as nitrogen and carbon dioxide, which can adversely affect performance of the fuel cell assembly. In particular, hydrogen may be consumed in the electrochemical reaction, with undesired components (e.g., inert gases such as nitrogen and/or carbon dioxide) remaining near the PEM, and undesirably impeding delivery of additional hydrogen thereto.

Thus, a need exists for a mechanism for extinguishing undesired gas and/or liquid from a flow field (e.g., a gas diffusion layer) of a fuel cell. A further need exists for such a mechanism to perform without interfering with operation or degrading output of the fuel cell. An additional need exits for increasing power density of the fuel cell, for instance, at high current density.

SUMMARY OF THE INVENTION

Pursuant to the present invention, shortcomings of the existing art are overcome and additional advantages are provided through the provision of a fuel cell with selective pressure variation and dynamic inflection.

In one aspect of the invention, a fuel cell flow field fluid service promotion system includes a flow path and a pulsator. The flow path services a fluid for a fuel cell. A discharge fluid portion is located in a diffusion layer portion. The diffusion layer portion is located between a flow channel portion and a membrane electrode assembly portion of the fuel cell. The pulsator is in fluid communication with the flow path. The pulsator causes a selected pressure variation along a part of the flow path to move the discharge fluid portion away from the membrane electrode assembly portion and/or the fuel cell. An increase in power density is obtained.

In another aspect of the invention, the selected pressure variation can cause an expansion and/or a contraction in the diffusion layer portion to move the discharge fluid portion away from the membrane electrode assembly portion and/or move a reaction fluid portion toward the membrane electrode assembly portion.

The invention further contemplates a fuel cell flow field fluid service promotion method. A flow path is employed to service a fluid for a fuel cell. A discharge fluid portion is located in a diffusion layer portion. The diffusion layer portion is located between a flow channel portion and a membrane electrode assembly portion of the fuel cell. A pressure along a part of the flow path is selectively varied to move the discharge fluid portion away from the membrane electrode assembly portion and/or the fuel cell. An increase in power density is obtained.

In yet another aspect of the present invention, the selective varying of the pressure serves to expel and/or wring the discharge fluid portion from the diffusion layer portion.

The invention also contemplates a fuel cell flow field fluid service promotion method. A flow path is employed to service a fluid for a fuel cell. A discharge fluid portion is located in a diffusion layer portion. The diffusion layer portion is located between the flow channel portion and a membrane electrode assembly portion of the fuel cell. The membrane electrode assembly portion is dynamically inflected to move the discharge fluid portion away from the membrane electrode assembly portion and/or the fuel cell.

Thus, the present invention advantageously provides enhanced flow field fluid service for a fuel cell. Further, the invention removes unwanted fluid from the fuel cell. Also, an increase in power density of the fuel cell is obtained. Moreover, an external mechanism may be employed to enhance internal operation of the fuel cell.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

FIG. 7 is a side representation of a neutral position of a membrane electrode assembly between gas diffusion layers, illustrating exemplary flow columns;

FIG. 8 is a side representation of the membrane electrode assembly and the gas diffusion layers of FIG. 7, illustrating a flexed condition;

FIG. 9 is an enlarged, cutaway, sectional, partial side representation of anode and cathode flow channel sections on opposite sides of a membrane electrode assembly between gas diffusion layers, illustrating a neutral position;

FIG. 10 is a side representation of the flow channel sections of FIG. 9, illustrating the membrane electrode assembly and the gas diffusion layers in a flexed condition;

BEST MODE FOR CARRYING OUT THE INVENTION

In accordance with the principles of the present invention, a fuel cell assembly is provided in which selective pressure variation(s) of reactant fluid portion(s) and/or dynamic inflection(s) of membrane electrode assembly portion(s) and/or gas diffusion layer portion(s) enhance flow field fluid service and/or increase power density.

Figure 1:
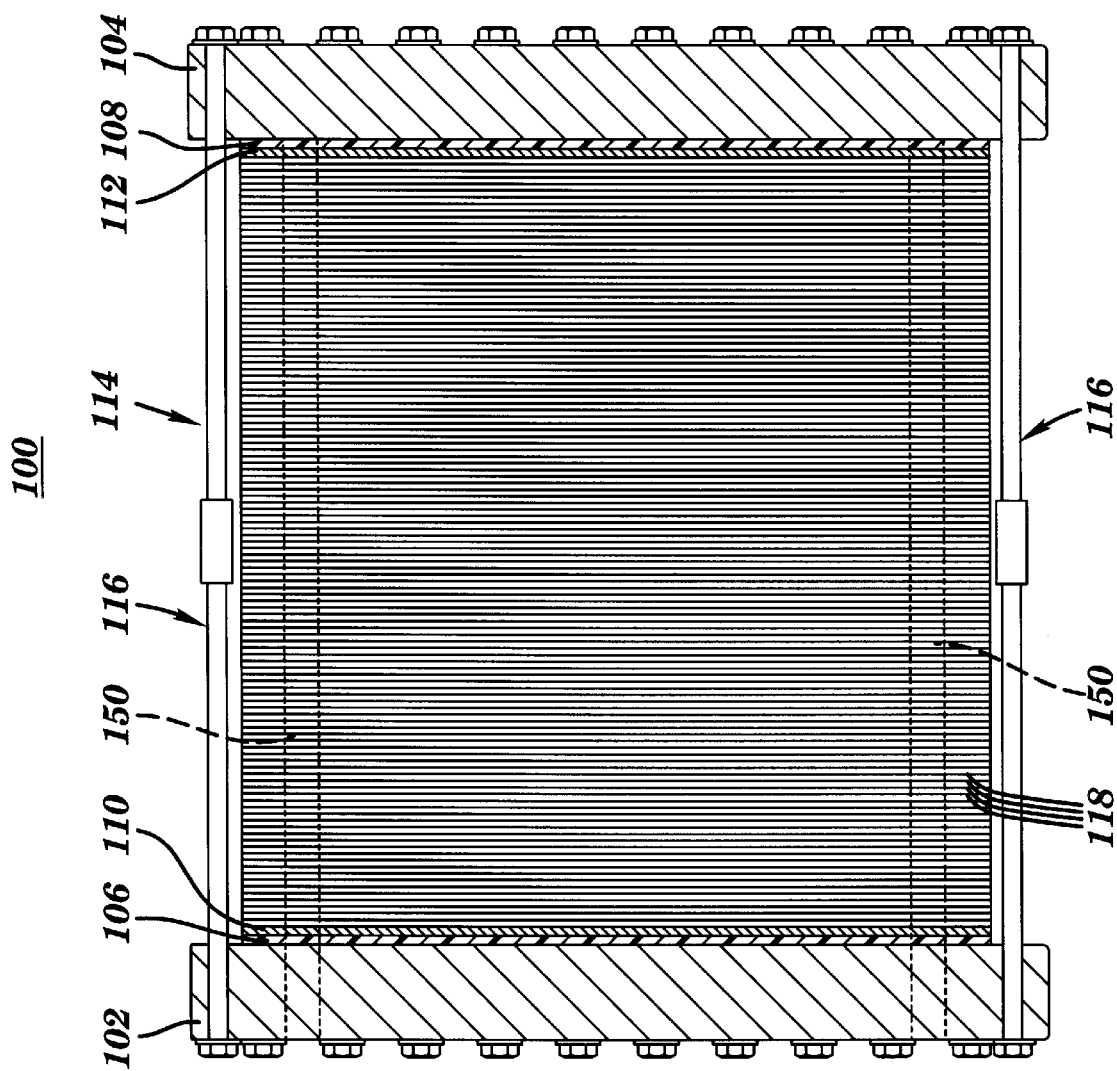
FIG. 1 is a sectional, elevation, side view of one example of a fuel cell assembly incorporating and using the flow field fluid service and power density capabilities of the present invention.

An example of a fuel cell assembly incorporating and using the novel features of the present invention is depicted in FIG. 1 and described in detail herein.

In this exemplary embodiment, a fuel cell assembly 100 includes end plates 102 and 104, insulation layers 106 and 108, and current collector/conductor plates 110 and 112, with a working section 114 therebetween. The working section includes one or more active sections and can include a selected number of cooling sections, as will be understood by those skilled in the art. In one aspect, the one or more active sections can further serve to perform cooling for the fuel cell assembly. A number of structural members 116, such as tie-bolt(s), can be employed to join the end plates.

Working section 114 includes a number of layers 118. The layers generally form fluid manifolds 150 for supplying fluids to, removing fluids from, and otherwise communicating and/or servicing fluids as desired within the working section, as will be appreciated by those skilled in the art. The layers of fuel cell assembly 100 might have applied thereto compressive pressure and/or stress which is approximately equivalent to, preferably, fifty to one thousand pounds per square inch, and, most preferably, two hundred to four hundred pounds per square inch.

Figure 3:
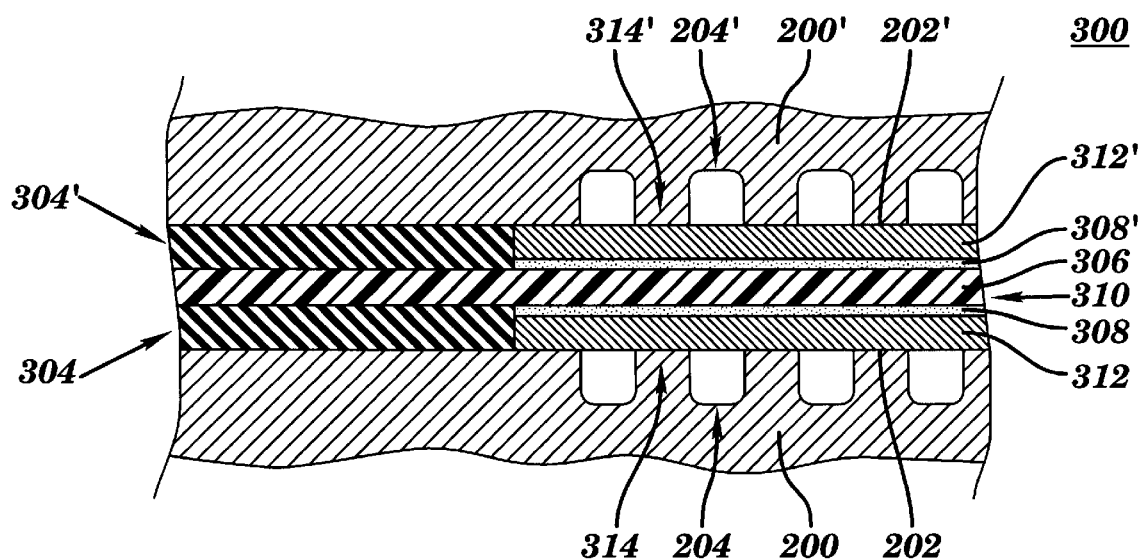
FIG. 3 is a cutaway, sectional, partial, side representation of fluid flow plates serving as flow field plates in a fuel cell of the fuel cell assembly of FIG. 1.

Preferably, a plurality of layers 118 form one or more (e.g., one hundred and eight) PEM-type fuel cells 300 (FIG. 3). The construction and utilization of PEM fuel cells is known in the art. By connecting an external load (not shown) between electrical contacts (not shown) of current collector/conductor plates 110 and 112, one can complete a circuit for use of current generated by the one or more PEM-type fuel cells.

Figure 2:
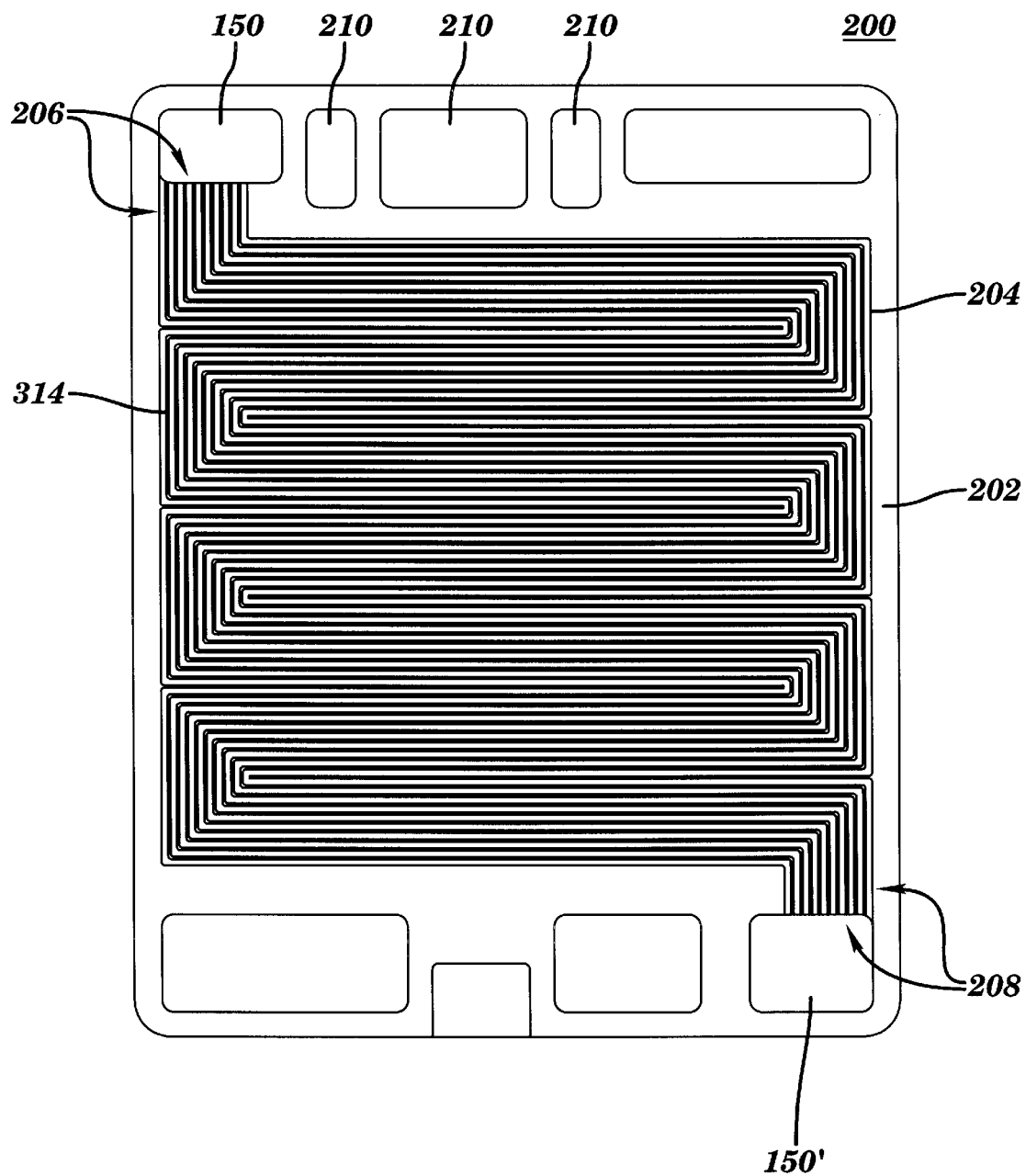
FIG. 2 is a plan view of an outer face of one example of a fluid flow plate of the fuel cell assembly of FIG. 1.

One example of a layer 118 of working section 114 is depicted in FIG. 2 as fluid flow plate 200. The plate has a fluid flow face 202 with one or more, for instance, substantially parallel and/or generally serpentine, flow channel(s) 204 thereon. The flow channels receive and transmit one or more fluids through ports 206 and 208 which are in fluid communication with corresponding fluid manifolds 150 and 150'.

In one embodiment, flow channel(s) 204, through formation of solid sidewalls in fluid flow face 202, may have any preselected configuration(s), such as for providing and/or ensuring maximal, even, continuous, appropriate, desired and/or uniform fluid service and/or coverage for active area(s) of membrane electrode assembly 310 (FIG. 3). In one example, land(s) 314, 314' (FIG. 3) may separate adjacent flow channel sections.

As will be understood by those skilled in the art, a given fluid flow plate 200 may be a bipolar, monopolar, combined monopolar (e.g., anode cooler or cathode cooler), or cooling plate. In one example, the fluid flow plate serves as a flow field plate and flow channels 204 conduct fluid which includes reactant fluid for fuel cell assembly 100. The reactant fluid serves as fuel or oxidant for a given fuel cell 300 (FIG. 3). For instance, the flow channels can carry reactant gas (e.g., a fuel such as hydrogen or an oxidant such as air/oxygen) as well as vapor and/or liquid (e.g., humidification and/or product water), as will be understood by those skilled in the art.

Referring to FIG. 2, fluid flow plate 200 has a number of (e.g., peripheral) holes 210 therethrough. A number of the holes 210 may cooperate in formation of fluid manifolds, such as fluid manifolds 150, of fuel cell assembly 100. Preferably, the perimeters of layers 118 are formed with minimal amounts of material disposed generally transversely beyond the active extent of working section 114 as well as the fluid manifolds of the fuel cell assembly, as represented in FIG. 2. In one example, the fluid flow plate may be formed with a material such as non-magnetic, austenitic stainless steel. In another example, a material such as titanium may be employed.

In one embodiment, gasketing material or gaskets 304, 304' (FIG. 3) may be employed to seal peripheral holes 210 (FIG. 2), and may cooperate with other portions of layers 118 in formation of the fluid manifolds. Referring to FIG. 3, a given gasket 304, 304' might take the form of, for instance, a frame gasket made from a polytetrafluoroethylene ("PTFE") material manufactured by E. I. Du Pont de Nemours and Company and sold under the trademark TEFLON®. In another embodiment, O-ring gasket(s) might be employed.

For purposes of illustration, FIG. 3 depicts fuel cell 300 with fluid flow plates 200 and 200' serving as flow field plates. In particular, flow field plate 200 might serve as an anode side of the fuel cell, and flow field plate 200' might serve as a cathode side of the fuel cell. That is, face 202 might comprise an anode face, and face 202' might comprise a cathode face. For instance, flow channels 204 might carry hydrogen, as fuel, and humidification water (vapor and/or liquid). Further, flow channels 204' might carry air/oxygen, as oxidant, as well as humidification water (vapor and/or liquid) and/or product water (vapor and/or liquid), as will be understood by those skilled in the art.

Fuel cell 300 includes membrane or solid electrolyte 306. Preferably, the solid electrolyte 306 comprises a solid polymer electrolyte made using a polymer such as a material manufactured by E. I. Du Pont de Nemours and Company and sold under the trademark NAFION®. Further, an active electrolyte such as sulfonic acid groups might be included in this polymer. In another example, the solid polymer electrolyte might be formed with a product manufactured by W.L. Gore & Associates (Elkton, Md., U.S.A.) and sold under the trademark GORE-SELECT®. Moreover, catalysts 308 and 308' (e.g., platinum), which facilitate chemical reactions, are applied to the anode and cathode sides, respectively, of the solid polymer electrolyte. This unit can be referred to as a "membrane electrode assembly" (hereinafter "MEA") 310. The MEA might be formed with a product manufactured by W.L. Gore & Associates and sold under the trade designation PRIMEA 5510-HS.

MEA 310 is sandwiched between anode and cathode gas diffusion layers (hereinafter "GDLs") 312 and 312', respectively, which may be formed with a resilient and conductive material such as carbon fabric, carbon fiber paper, carbon cloth or carbon paper.

In one embodiment of a gas diffusion layer (hereinafter "GDL") 312, 312', porous carbon cloth or paper is infused with a slurry of carbon black and sintered with TEFLON® material. The anode and cathode GDLs serve as electrochemical conductors between corresponding catalyzed sites of solid polymer electrolyte 306 and the fuel (e.g., hydrogen) and oxidant (e.g., air/oxygen) which each flow in anode and cathode flow channels 204 and 204', respectively. Further, the GDLs also present to the surfaces of MEA 310 a combination of microscopic porosity and macroscopic porosity. Microscopic porosity allows reactant gas molecules to pass generally longitudinally from the flow channels to a surface of the MEA. Macroscopic porosity allows product water formed at the cathode surface of the MEA to be removed therefrom by flowing generally longitudinally into the cathode flow channels, to prevent flooding of the catalyst particles.

In one example, deionized water might be added to a given reactant gas stream conducted by flow channel(s) 204, 204'. The water would desirably serve to humidify membrane 306. A reactant fluid (e.g., gas) stream may be humidified in any of a variety of ways, as will be understood by those skilled in the art.

Referring to FIG. 3, it is desirable to provide maximal conductivity between catalyst 308 and electrical contact position(s) on face 202, and between catalyst 308' and electrical contact position(s) on face 202', as will be appreciated by those skilled in the art. That is, it is advantageous to maximize conductivity between the anode face of MEA 310 and the electrical contact position(s) on the anode face 202, and between the cathode face of the MEA and the electrical contact position(s) on the cathode face 202'.

For example, still referring to FIG. 3, portions of lands 314 and 314' may serve as electrical contact positions on corresponding anode and cathode faces 202 and 202'. The land(s) 314, 314' may be formed, for instance, with a material such as non-magnetic, austenitic stainless steel. In another example, a material such as titanium may be employed.

Referring further to FIG. 3, GDL 312 is located between lands 314 and (e.g., catalyst 308) the anode side of MEA 310, and GDL 312' is located between the lands 314' and (e.g., catalyst 308') the cathode side of the MEA.

Figure 4:
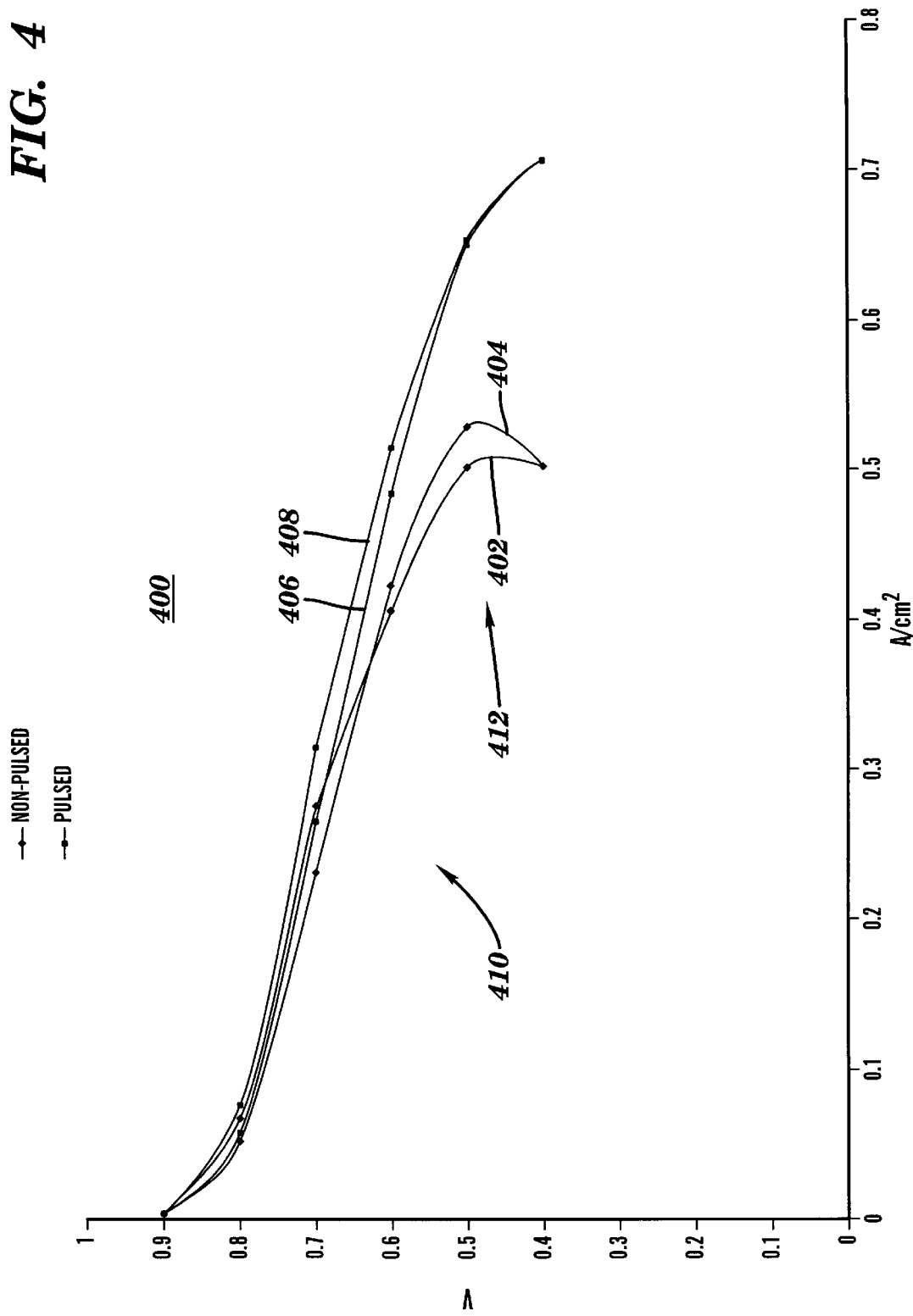
FIG. 4 is a graph of fuel cell voltage versus current density for steady-state cases and pulsed cases.

Now referring to FIG. 4, experimental test cases were run to compare steady-state flow versus pulsed flow, in providing reactant fluid service(s) for fuel cell assembly 100. Graph 400 includes plots 402 and 404 illustrative of steady-state reactant fluid flow. Furthermore, the graph 400 includes plots 406 and 408 illustrative of pulsed reactant fluid flow. The graph 400 charts fuel cell voltage versus current density. An exemplary discussion of the behavior of the plots 402 and 404 appears in *Fuel Cells, a Handbook (Revision* 3) (pages 2-1 to 2-8, authored by J. H. Hirschenhofer, D. B. Stauffer, and R. R. Engleman, published by Gilbert/Commonwealth, Inc., Reading, Pa., 19603, U.S.A., under Contract No. DE-AC01-88FE61684, U.S. Department of Energy, Office of Fossil Energy, Morgantown Energy Technology Center, P.O. Box 880, Morgantown, W.V., 26507-0880, U.S.A., identified as DOE/METC-94/1006, (DE94004072), dated January 1994, and available to the public from the National Technical Information Service, U.S. Department of Commerce, 5285 Port Royal Road, Springfield, Va., 22161, U.S.A.). In particular, the plots 402 and 404 exhibit a somewhat linear central region, generally indicated as region 410. Furthermore, the plots 402 and 404 terminate in a region characterized by diffusion loss at relatively large current densities, generally indicated as region 412. As discussed in *Fuel Cells, a Handbook*

(*Revision* 3), the plots 402 and 404 demonstrate that for the region 412 of relatively high current densities, there is an inability to diffuse enough reactants to the electrochemical reaction sites. This translates into reactant concentration losses, so that fuel cell 300 may experience a sharp performance decrease through reactant starvation. Furthermore, there may also be an associated problem of diffusing the products of the electrochemical reaction from the fuel cell.

Still referring to FIG. 4, plots 406 and 408 illustrate increased power density provided by fuel cell 300 through pressure oscillation. Namely, in region 412 of sharp performance decline in the non-pulsed operation represented by plots 402 and 404, the plots 406 and 408 show greater voltage at a given current density and greater current density at a given voltage. That is, the present invention addresses the mass transport problem, thereby yielding greater power density, as discussed herein.

While the specific data of FIG. 4 reflect experimental test cases, the behaviors and advantages illustrated in FIG. 4 may be considered to generally illustrate typical benefits of various aspects of the invention over previous approaches.

For exemplary purposes, FIG. 4 depicts test cases run under illustrative conditions. For instance, reformate was supplied to the anode side of fuel cell 300. Those skilled in the art will understand that, in one example, reformate may be supplied to the anode side of the fuel cell rather than pure hydrogen, such as for reasons of cost, combustibility, and/or availability. However, the reformate typically includes undesired gases in addition to a particular fuel (e.g., hydrogen). For example, the reformate may include an inert gas such as nitrogen. The particular reformate employed in the test cases had the following exemplary composition: fourteen and one-half percent hydrogen, seventy-nine percent nitrogen, and six and one-half percent carbon dioxide. For illustrative purposes, plots 406 and 408 reflect experiments in which pulsation was applied just at the entrances to the anode reactant fluid manifolds.

Further referring to FIG. 4, during occurrence(s) of electrochemical reaction(s) in fuel cell 300, the hydrogen may be consumed at the anode side of MEA 310, leaving inert gas such as nitrogen lingering at the anode side of the MEA (e.g., "nitrogen blanketing"). Undesirably, such lingering of inert gas may impede replenishment of fuel for the electrochemical reaction, thereby adversely affecting performance, as illustrated for region 412 by plots 402 and 404. In addition, failure to remove product fluid, such as from the cathode side of the MEA, may further degrade performance, as described herein.

The test cases depicted in FIG. 4 placed a support member on each side of the fuel cell, between a flow field face and a gas diffusion layer. An exemplary configuration for such a support member is disclosed in U.S. Application Ser. No. 09/067,098 of Daniel O. Jones (entitled "Fuel Cell Assembly Unit for Promoting Fluid Service and Electrical Conductivity," filed Apr. 27, 1998, and assigned to Plug Power, L.L.C.), which is hereby incorporated herein by reference in its entirety.

Additional description is presented below concerning problem(s) illustrated by plots 402 and 404 of FIG. 4, and advantage(s) provided by the present invention and represented by plots 406 and 408.

Figure 5:
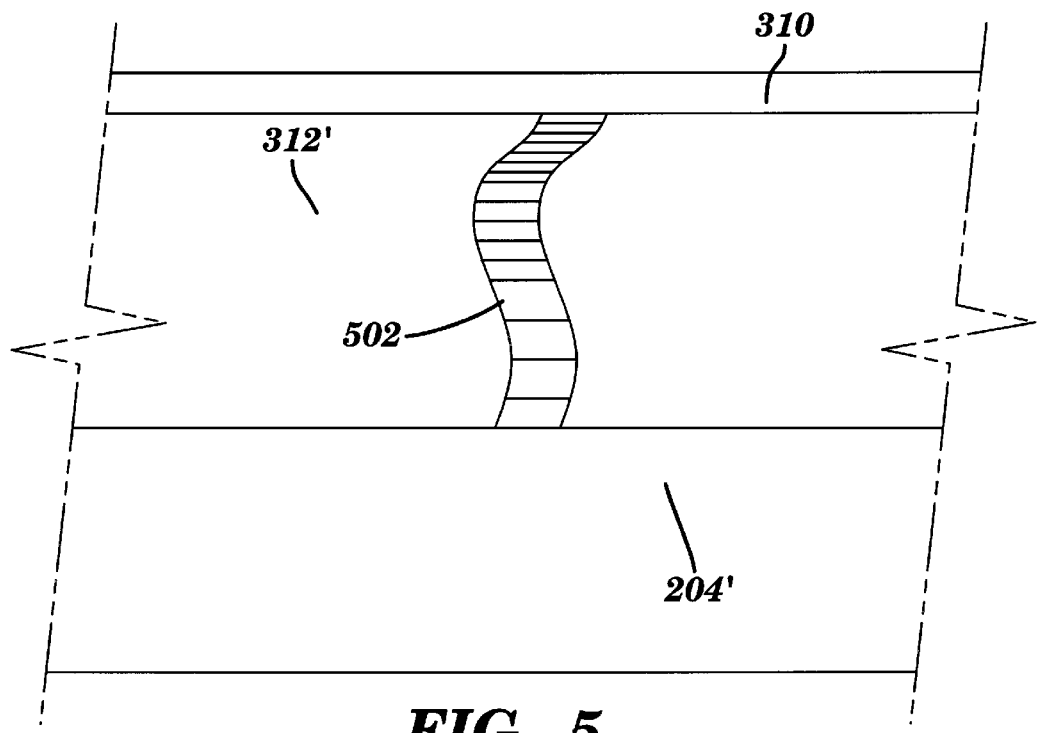
FIG. 5 is an enlarged, cutaway, sectional, partial, side representation of one example of effect of pulsed reactant fluid flow in a gas diffusion layer, with little or no movement of a membrane electrode assembly.
Figure 16:
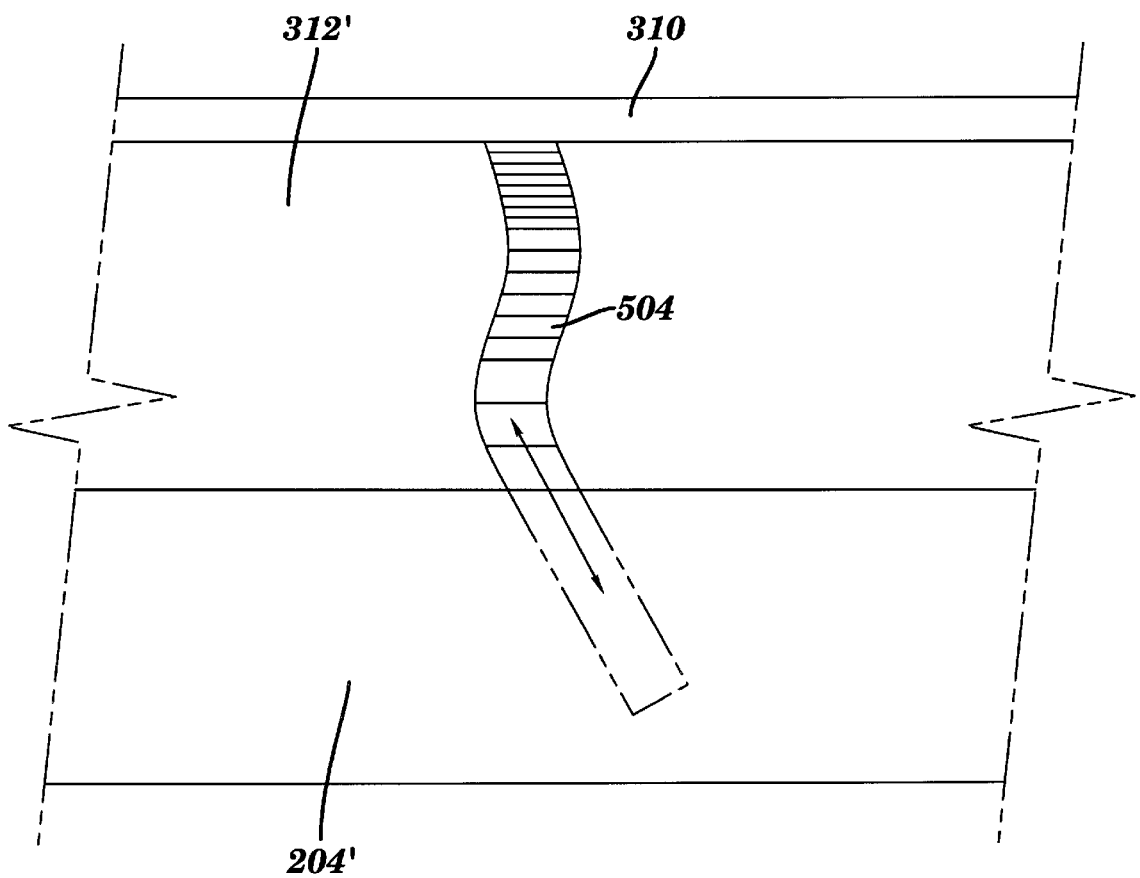
FIG. 16 is an enlarged, cutaway, sectional, partial, side representation of another example of effect of pulsed reactant fluid flow in a gas diffusion layer, with little or no movement of a membrane electrode assembly.
Figure 17:
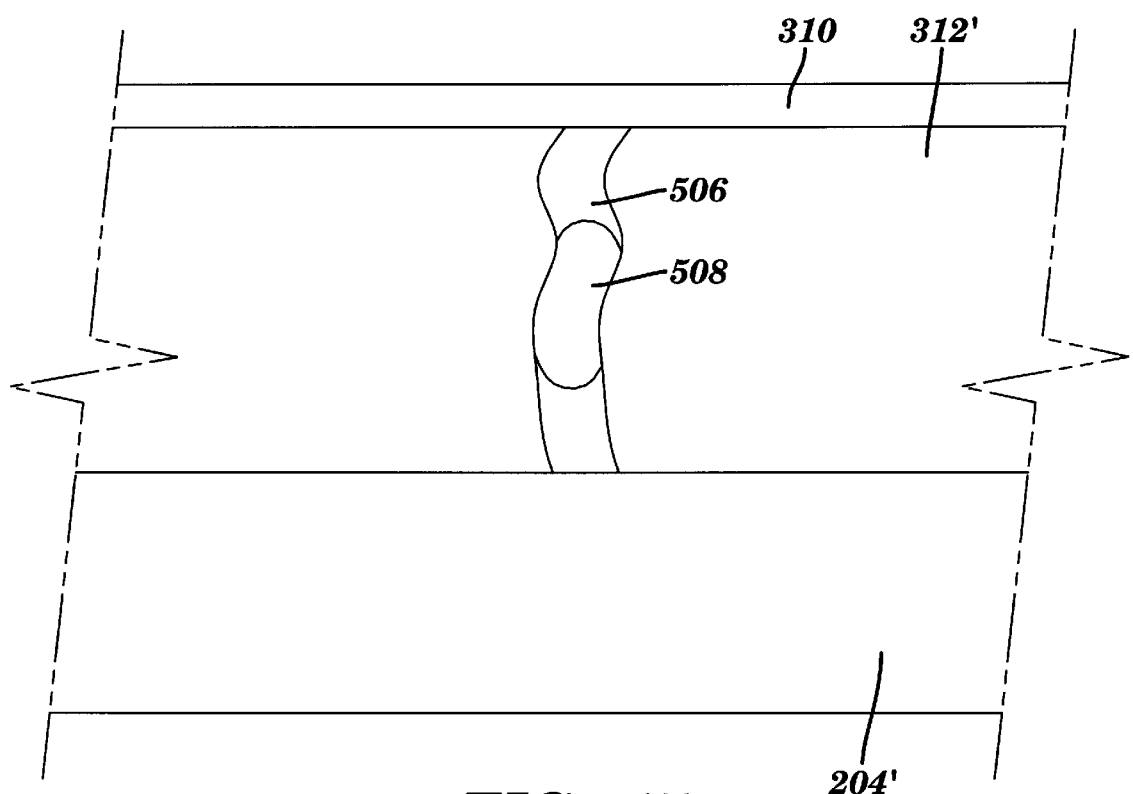
FIG. 17 is an enlarged, cutaway, sectional, partial, side representation of a further example of effect of pulsed reactant fluid flow in a gas diffusion layer, with little or no movement of a membrane electrode assembly.

Referring to FIGS. 5 and 16–17 and considering the cathode side of fuel cell 300, GDL 312' may provide flow paths between MEA 310 and flow channel section(s) 204'. For explanatory purposes, one may consider the GDL 312' to include a number of columns for providing fluid service between the MEA and the flow channel section(s). Those skilled in the art will understand such columns may include various intersection(s) and/or share certain interstice(s) of the GDL 312'.

Again referring to FIG. 5, in one example, column 502 may serve to illustrate concentration gradient(s) of fluid serviced for the cathode side of fuel cell 300. In particular, the column 502 may serve to illustrate a tendency to accumulate inert gas near the MEA at the expense of decreased reactant fluid (e.g., oxidant) provided thereto. While such a gradient between plentiful reactant in the flow channel and depleted concentration of the reactant at the MEA may motivate a (e.g., modest) replenishment of the reactant at the MEA, this mechanism usually becomes inadequate at high current densities. Such problem(s), may be remedied by the present invention, as described herein.

Referring now to FIG. 16, column 504 illustrates advantage(s) provided by selective pressure oscillation in the fluid serviced for the cathode side of fuel cell 300. Namely, a higher pressure will decrease the volume occupied by a given gas (e.g., reformate), and a decreased pressure will allow the same gas to occupy a greater volume. That is, quantity of gas within GDL 312' and in the column 504 will vary proportionally with pressure, as will be understood by those skilled in the art. In one aspect, oscillation of the pressure at the cathode side of the fuel cell encourages expelling of used fluid (e.g., inert gas and/or product water) from the GDL 312' and into flow channel 204', to be swept away to an exit fluid manifold. As described herein, the expansion and contraction of volume which enables the removal of undesired fluid from the GDL 312', in another aspect, allows unused reactant fluid to enter into the GDL 312', to service MEA 310. Therefore, reactant may be supplied to the MEA so the electrochemical reaction can continue, even at high current densities.

In a still further aspect, referring to FIG. 17, column 506 may serve to illustrate water droplet (e.g., product water and/or humidification water) 508 clogging the column 506. Undesirably, with the water droplet clogging the column 506, the column 506 is (e.g., partially or completely) unavailable to service fluid for the cathode side of fuel cell 300. In one example, owing to obstruction, inert gas may not be expelled from the MEA 310 to the flow channel 204' through the column 506, and unused reactant fluid may not be delivered to the MEA through the column 506 from the flow channel 204'.

In accordance with the principles of the present invention, pressure oscillation(s) and/or dynamic inflection(s) may advantageously be employed to promote freeing of the water droplet from frictional force(s) in the column 506. As will be appreciated by those skilled in the art, any loosening or jostling of the water droplet preferably in combination with continued pressure oscillation(s) and consequent motivated movement(s) and/or exchange(s) of fluid(s), may desirably serve to remove the water droplet from the GDL 312', to be swept away to a discharge fluid manifold.

Figure 6:
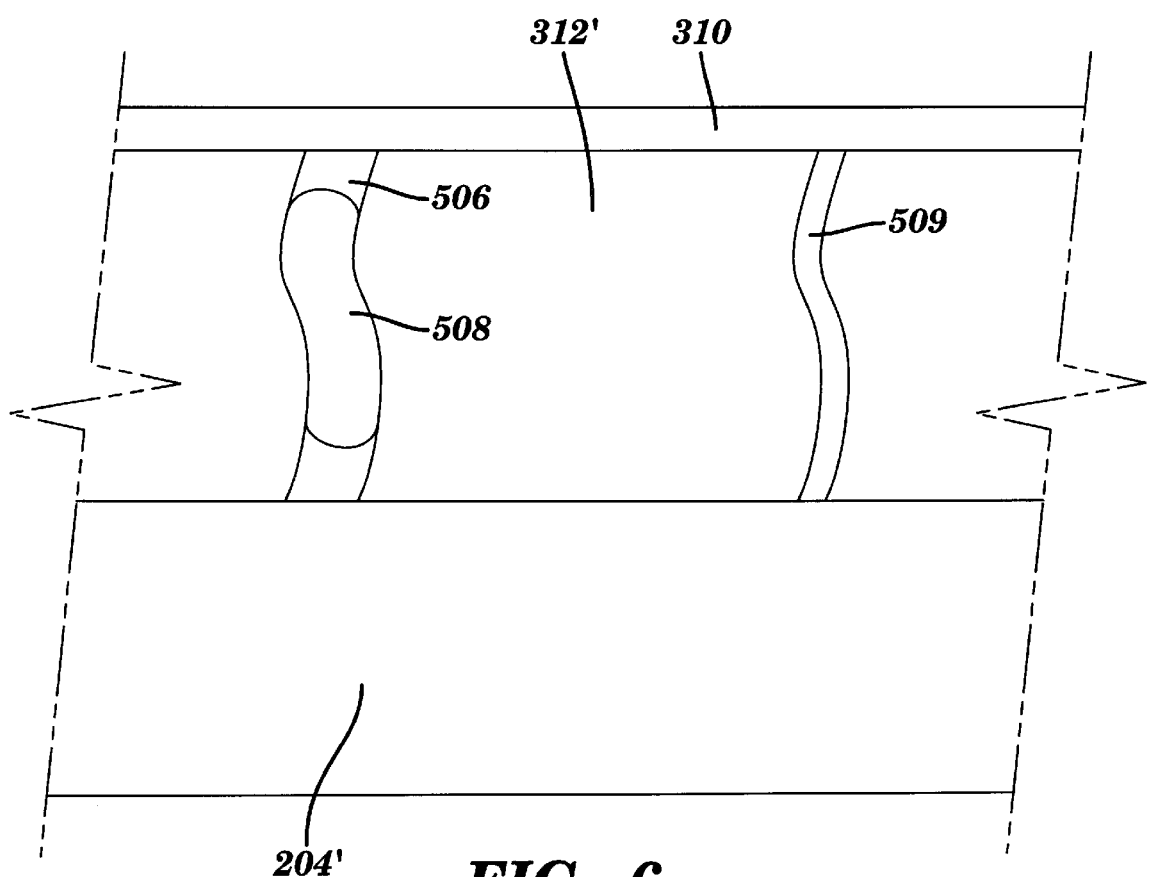
FIG. 6 is an enlarged, cutaway, sectional, partial, side representation of effect on an exemplary flow column of inflection of a membrane electrode assembly and a gas diffusion layer.

Now turning to FIG. 6, columns 506 and 509 further serve to illustrate an additional mechanism for enhancing fluid service and/or increasing power density for fuel cell 300. As described herein, pressure oscillation(s) in fluid(s) for the fuel cell may serve to inflect MEA 310 and/or GDL(s) 312 and/or 312'. Such pressure variation(s) and/or inflection(s) may serve to wring and/or expel undesired fluid(s) from the column 506. Also, by variously (e.g., sequentially, periodically or sporadically) presenting layer(s) with degree(s) of inflection, neutral position(s), mirror-image inflection(s)

and/or any intermediate or extreme position(s), fluids may be advantageously moved. For instance, by passing from the state depicted for the column 506 with water droplet 508, to the state depicted for the column 509, a particular column would be manipulated to expel fluid (e.g., inert gas and/or product water) therefrom. In addition, by being so changed, the particular column would have created therein a partial vacuum, thereby drawing in unused reactant fluid from flow channel section 204' to supply the electrochemical reaction at the MEA 310.

For explanatory purposes, FIG. 7 illustrates MEA 310 and GDLs 312 and 312' in neutral or relaxed state(s). FIG. 8 illustrates the layers in state(s) of inflection toward the cathode side of fuel cell 300. Through transition(s) between relaxation(s) and inflection(s), as can be understood through examination of FIGS. 7–8, multiple instances of column 504 may consequently be wrung to expel undesired fluid(s) from anode GDL 312, and draw unused reactant fluid into cathode GDL 312' from flow channel(s) 204'. As will be appreciated by those skilled in the art, reverse procession(s) and/or inverse inflection(s), may desirably serve to expel undesired fluid(s) from the cathode GDL 312', and draw unused reactant fluid into the anode GDL 312 from flow channel(s) 204.

In one example, FIG. 9 may serve to illustrate a neutral or relaxed position of MEA 310 sandwiched by GDLs 312 and 312' between flow channel sections 204 and 204'. FIG. 10 may serve to illustrate the MEA and the GDLs in an inflected position with respect to the flow channel sections, where the inflection is depicted as toward and into the cathode flow channel section 204' and away from the anode flow channel section 204. In one aspect, the inflection of the MEA and the GDLs toward the cathode flow channel section serves to expel, wring and/or throw out undesired fluid from the anode side of the MEA and the anode GDL, into the anode flow channel section to be swept away from the anode side of the fuel cell and to an exit fluid manifold. In another aspect, the inflection toward the cathode side of fuel cell 300 and away from the anode side of the fuel cell, serves to draw in unused cathode reactant fluid from the cathode flow channel section and into the cathode GDL to be delivered to the cathode side of the MEA, as will be appreciated by those skilled in the art.

Similarly, referring to FIGS. 9–10, a mirror-image inflection toward the anode side of fuel cell 300 and away from the cathode side of the fuel cell may serve to reverse the above-described functions, with desired intermixing(s) and/or exchange(s) occurring to continuously replenish and adequately supply the MEA for enhanced (e.g., optimal) operation of the fuel cell.

A description of exemplary employment of pulsator(s) is presented below with reference to FIGS. 11–12. As used herein, "pulsator" broadly includes any mechanism(s), device(s), unit(s) and/or the like which may serve to vary pressure(s).

Figure 11:
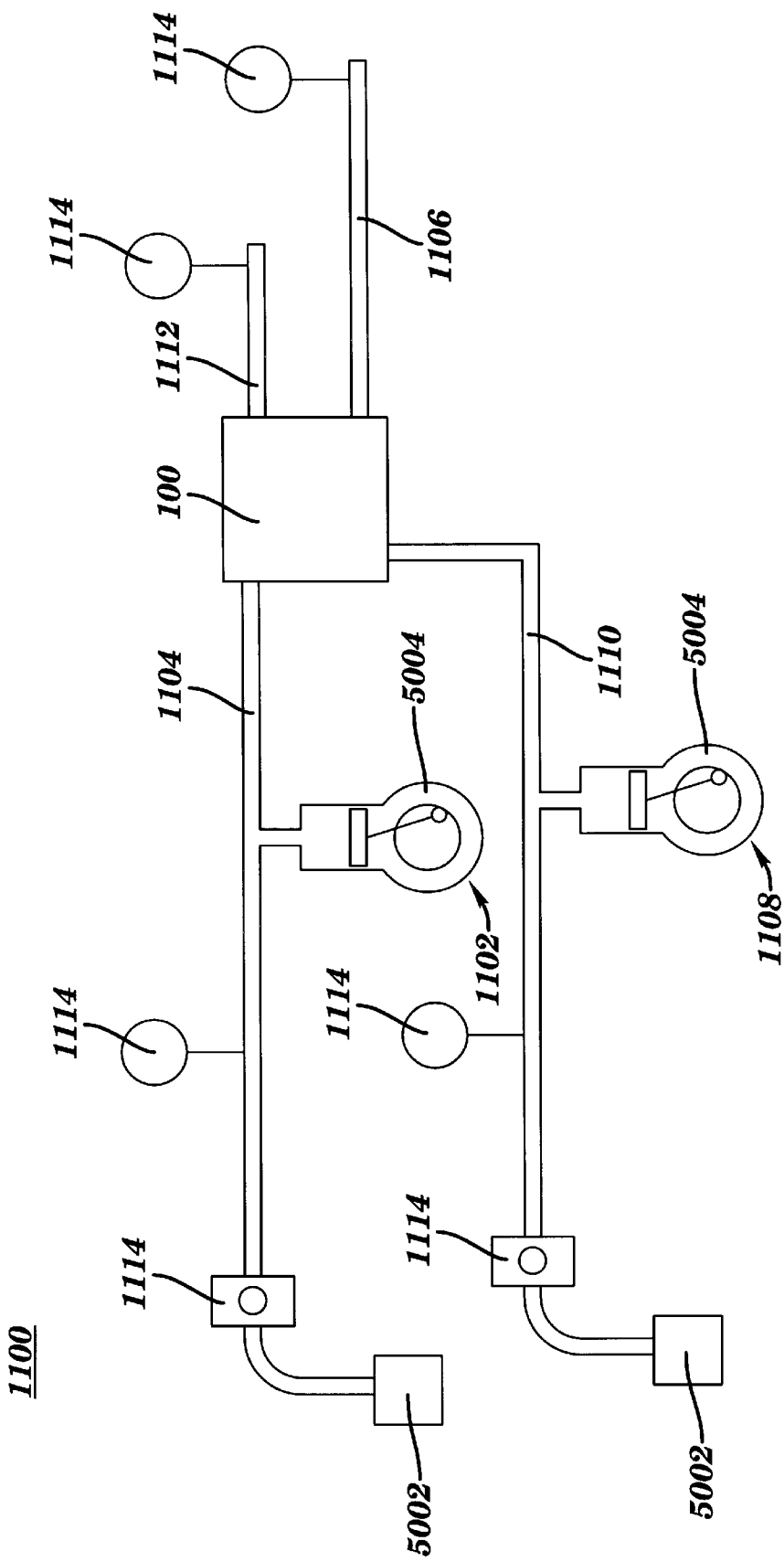
FIG. 11 is a partial, schematic hardware representation of pulsators located at entrances of reactant fluid manifolds for a fuel cell assembly.

Referring to FIG. 11, in one example, hardware arrangement 1100 may serve to introduce pressure oscillation(s) and/or dynamic inflection(s) within fuel cell assembly 100. A first instance of pulsator 5004 is in fluid communication with fuel entrance manifold 1104 providing reactant fuel (e.g., hydrogen and/or reformate) to the fuel cell assembly. The fuel entrance manifold may be in fluid communication with one or more instances of flow meter, gage, or regulator 1114, which in turn may be in fluid communication with an instance of compressor 5002, as will be understood by those skilled in the art. Exit fluid manifold 1106 illustrates a discharge flow path for fluid (e.g., inert gas and/or excess humidification fluid) from the anode portions of the fuel cell assembly. In addition, a second instance of pulsator 5004 is in fluid communication with oxidant entrance manifold 1110 supplying fluid (e.g., oxygen and/or air) to the fuel cell assembly. The oxidant entrance manifold may be in fluid communication with one or more instances of flow meter 1114, which in turn may be in fluid communication with an instance of compressor 5002. Exit fluid manifold 1112 is in fluid communication with the fuel cell assembly in order to discharge fluid (e.g., product water, inert gases and/or excess humidification fluid) from the cathode portions of the fuel cell assembly. The exit fluid manifolds 1106 and 1112 may be in fluid communication with instances of gages 1114, as will be understood by those skilled in the art. The pulsators 5004 may include, for example, piston-type or positive displacement pumps 1102 and 1108.

Figure 12:
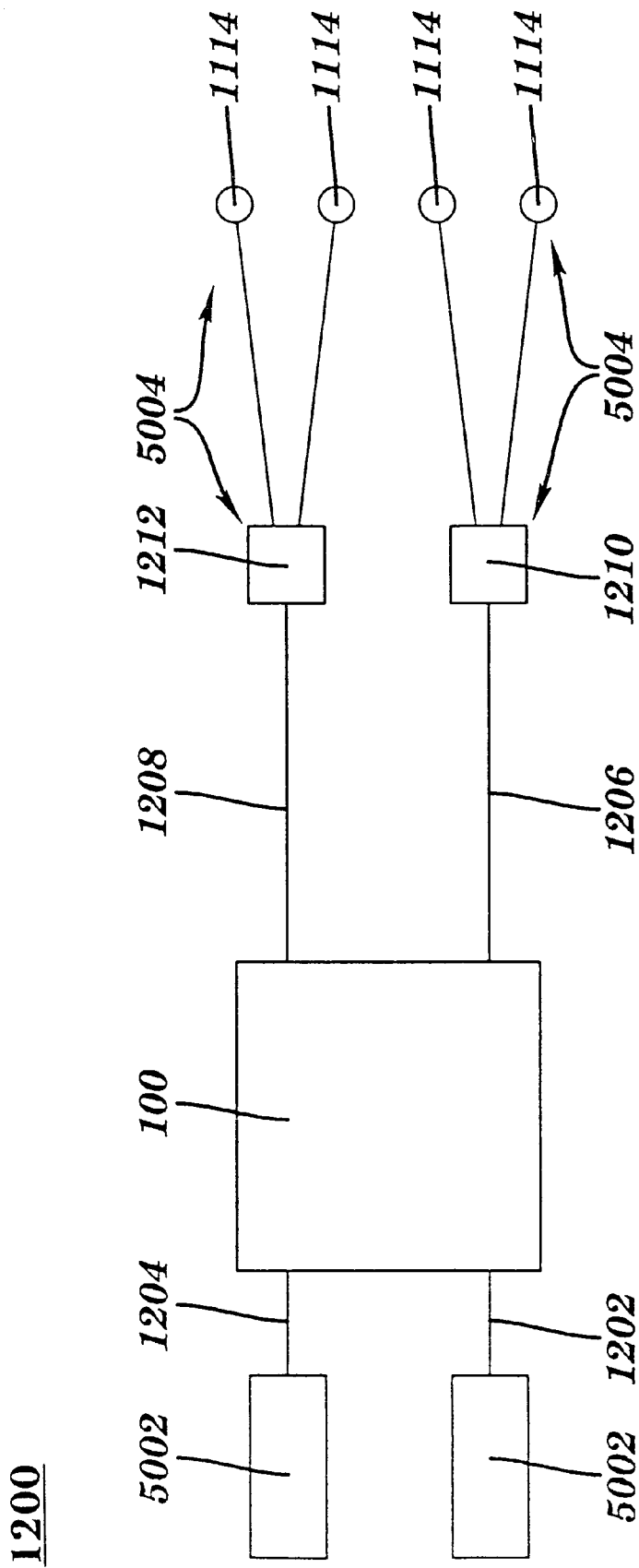
FIG. 12 is a partial, schematic hardware representation of pulsators located at exits of reactant fluid manifolds for a fuel cell assembly.

Referring to FIG. 12, in another example, hardware arrangement 1200 may place fuel cell assembly 100 in fluid communication with fuel entrance manifold 1202 and oxidant entrance manifold 1204. The fuel entrance manifold may be in fluid communication with an instance of compressor 5002, as will be understood by those skilled in the art. Further, the fuel cell assembly may be in fluid communication with exit fluid manifold 1206 and exit fluid manifold 1208. Moreover, the fuel exit fluid manifold 1206 may be in fluid communication with a first instance of pulsator 5004 comprising electronic solenoid 1210 in fluid communication with multiple instances of flow regulator 1114. For example, the electronic solenoid 1210 may be employed to switch among various pressures accessible with the multiple instances of the flow regulators, as will be appreciated by those skilled in the art. Likewise, the exit fluid manifold 1208 may be in fluid communication with a second instance of pulsator 5004 comprising electronic solenoid 1212 in fluid communication with additional instances of the flow regulator.

Referring to FIGS. 11–12, a system of the present invention may include or omit pulsator(s) at entrance and/or exit fuel manifold(s). Also, a system of the present invention may include or omit pulsator(s) at entrance and/or exit oxidant manifold(s). Preferably, at least one pulsator is employed in such a system. Moreover, any such system(s) applied to any portion(s) of fuel cell assembly 100 may serve to affect such portion(s) and/or any additional portion(s) of the fuel cell assembly. In one example, a pulsator may be formed with a product manufactured by Gast Manufacturing Corporation (Benton Harbor, Mich., U.S.A.), sold under the trademark GAST, and sold under the trade designation MOA-P125-JH.

Figure 13:
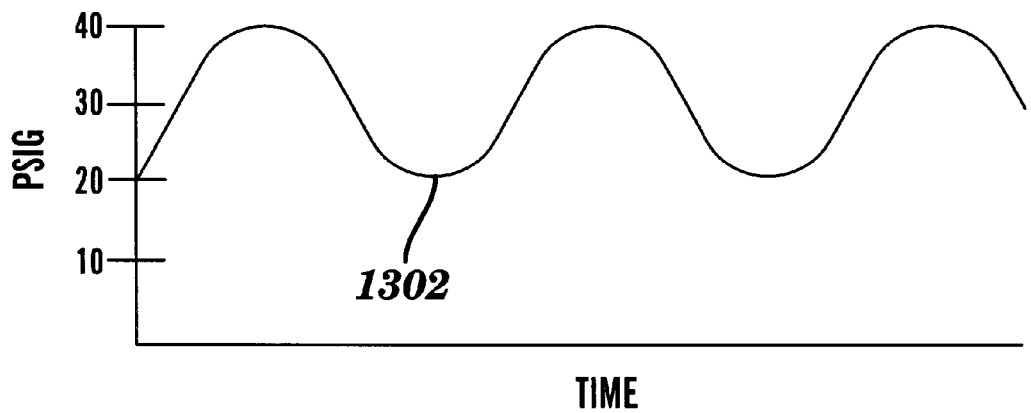
FIG. 13 is a graph of one example of pressure oscillation for reactant fluid service for a fuel cell assembly, illustrating in-phase operation.
Figure 14:
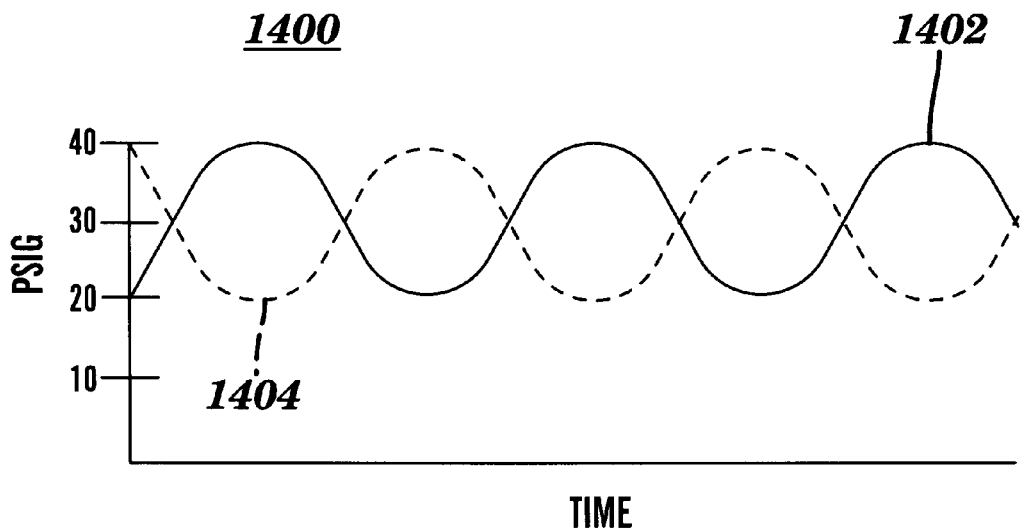
FIG. 14 is a graph of another example of pressure oscillation for reactant fluid service for a fuel cell assembly, illustrating out-of-phase pressure oscillation.
Figure 15:
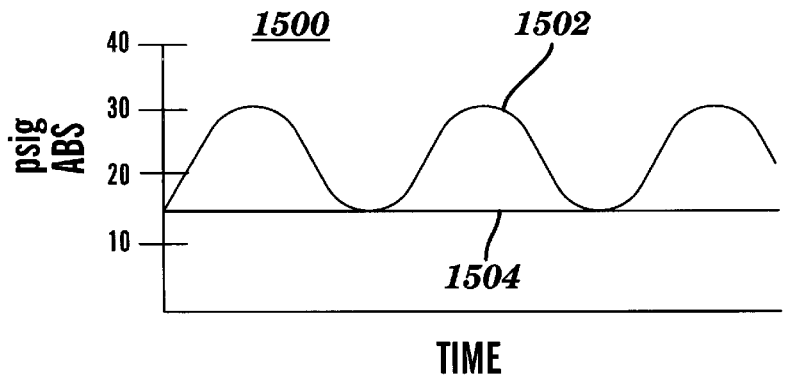
FIG. 15 is a plot of yet another example of pressure oscillation for reactant fluid service for a fuel cell assembly, illustrating active pressure oscillation for one reactant fluid while another reactant fluid has little or no pressure oscillation.

Referring to FIGS. 13–15, exemplary pressure oscillations for fluids services for fuel cell assembly 100 are presented, where graphs 1300, 1400, and 1500 depict exemplary pressure variance over time. In particular, plot 1302 illustrates in-phase pressure oscillation for the fuel and the oxidant serviced for the fuel cell assembly. In addition, plots 1402 and 1404 illustrate out-of-phase pressure oscillation for the fuel and the oxidant serviced for the fuel cell stack. Plots 1502 and 1504 illustrate pressure oscillation for one of the fuel and the oxidant serviced for the fuel cell assembly, concurrently with little or no pressure oscillation for the other one of the fuel and the oxidant.

In one example, referring to FIGS. 14–15, pressure oscillation(s) such as those represented in graphs 1400 and/or 1500 may be employed to dynamically inflect MEA 310 and/or GDL(s) 312 and/or 312', as discussed herein. Furthermore, such inflection(s) may serve to allow pressure oscillation(s) applied to a first side of fuel cell 300 to affect and/or enhance condition(s) on a second side of the fuel cell, as will be appreciated by those skilled in the art.

Again referring to FIGS. 13–15, the exemplary pressure oscillations depicted may be applied to any entrance and/or exit manifold servicing any fluid(s) for fuel cell assembly 100. For explanatory purposes, plots 1302, 1402, 1404 and 1502 are depicted as sinusoidal; however, those skilled in the art will appreciate such plots may have any characteristic(s) and/or behavior(s). For instance, any such plot(s) may include portion(s) which may be periodic, intermittent, non-repeating, sporadic, spiked and/or random. As will be understood by those skilled in the art, computing device(s), program(s), embedded system(s) and/or the like may be employed in, for example, production, control, and/or monitoring of such plot(s).

Still referring to FIGS. 13–15, in one example, a frequency for a certain pressure oscillation may be in the range 0.01 Hz to 100 Hz. In one aspect, an amplitude for pressure oscillation may vary with volume of moving fluid. For instance, a pressure oscillation may have an amplitude which is preferably in the range 0.1 p.s.i. to 100 p.s.i., and is most preferably in the range 1 p.s.i. to 30 p.s.i.

Returning to FIG. 4, in view of the descriptions above, one may comprehend how pressure variation(s) and/or dynamic inflection(s) may be applied and/or employed to increase amount(s) of reactant(s) used, thereby increasing power density (e.g., through a greater product of cell voltage and current density).

Referring further to FIG. 4, plots 402 and 404 may serve to illustrate exemplary fuel cell behavior for non-pulsed flow. Plots 406 and 408 may serve to illustrate exemplary improvement(s) over the plots 402 and 404, for pulsed flow. As will be appreciated by those skilled in the art, range(s) of improvement(s) may be selected and/or provided between the plots 402, 404 and the plots 406, 408 and/or beyond the improvement(s) exemplified by the plots 406, 408. In one aspect, more dramatic improvement(s) over the plots 402 and 404 may be provided as the percentage component of reactant is decreased and the percentage component of inert gas (e.g., nitrogen) is increased, in the fluid composition supplied to fuel cell assembly 100. For instance, considering anode fluid(s) service(s), as the percentage of hydrogen in the reformate is decreased, the pressure variation(s) and/or dynamic inflection(s) of the present invention may provide further improvement(s) in power density over non-pulsed flow. As described herein, such improvement(s) may be explained by operation(s) of the present invention in extinguishing inert gas(es) to combat deleterious effect(s) such as nitrogen blanketing. As also described herein, the present invention advantageously serves to remove excess liquid.

With respect to cathode fluid(s) service(s), as the percentage composition of oxygen in air supplied is decreased, the pressure oscillation(s) and/or layer(s) movement(s) of the present invention may provide ever-increasing benefit(s) over non-pulsed flow. On the cathode side, additional advantage(s) of the present invention in removing excess liquid may provide important advantage(s) of removing product water. Furthermore, excess humidification fluid may be removed from the anode and/or cathode sides.

Again referring to FIG. 4, through application of aspect(s) of the present invention, a certain degree of improvement is illustrated for region 410, with greater improvement depicted for region 412. The region 412 with non-pulsed flow shows a sharp performance decrease owing to diffusion loss. Advantageously, the present invention addresses the mass transport problem or challenge of the region 412, for pronounced benefits, as illustrated by offset(s) between the plots 402, 404 and plots 406, 408, representing greater power density.

Referring still to FIG. 4, in region 412, the previous diffusion loss resulting in greatly decreased voltage at high current density may stem from an inability to purge inert gas from MEA 310, so reactant is used at a quicker rate that it can be replenished, thereby limiting the electrochemical reaction rate. The present invention provides mechanical mixing(s) (e.g., through pressure oscillation and/or dynamic inflection) to assist diffusion(s) (e.g., which may be motivated by gradient(s) with consideration of stoichiometry) to enable greater power densities. In one aspect, the present invention allows unused reactant(s) to flow to the MEA, inert gas(es) to be removed from the MEA, and/or undesired gas(es) and liquid(s) to be removed from fuel cell 300, as described herein. In another aspect, pressure variation(s) applied to a reactant fluid for one side of the fuel cell may benefit that side and/or an additional (e.g., opposing) side of the fuel cell, for instance, in conjunction with and/or as motivation for inflection(s) of the MEA. In a further aspect, such advantage(s) may be actuated from outside fuel cell assembly, such as with pulsators.

A particular pressure variation may serve to cause advantageous effect(s). In one aspect, such pressure variation may cooperate with other pressure variation(s) to achieve desired outcome(s). That is, a certain cause may be a contributor to desired result(s), occupying any of a number of positions within hierarchical arrangement(s) of causation(s) for outcome(s), benefit(s), advantage(s) and/or the like. Similar treatment(s) may be afforded to a certain inflection of the present invention. Furthermore, combination(s) of pressure variation(s) and inflection(s) may have comparable relation (s).

As will be appreciated by those skilled in the art feature (s), characteristic(s), and/or advantage(s) of the system(s) described herein in any exemplary embodiment, may be applied and/or extended to any embodiment in accordance with the principles of the present invention. Further, any pressure oscillation(s) and/or variation(s) on any side of a fuel cell of the present invention, may serve to affect that side and/or any other side of the fuel cell. In one example, comparable aspects of the invention described herein for a cathode side in fuel cell assembly 100 may be applied to and/or (e.g., directly or indirectly) affect an anode side of the fuel cell assembly, and/or vice versa.

In accordance with the principles of the subject invention, flow channel(s) may be formed with variable cross section (s). Where a plurality of flow channels carry certain fluid on a given fluid flow face between entrance and exit fluid manifolds, each of the plurality of flow channels is preferably formed having substantially the same length. By designing the flow channels to have substantially identical length, one largely prevents variance in pressure drop among the flow channels, thereby promoting uniform and equal flow as well as superior overall performance. Further, any variance in cross-section along a given flow channel, is preferably substantially duplicated for companion flow channel(s) on the same fluid flow face which carry the same fluid for a same fuel cell.

A given fluid flow plate of the present invention which conducts fluids on both faces might be configured so the fluids have, for example, parallel flow, counter flow, and/or perpendicular flow among various (e.g., generally serpentine) flow channels. In particular, a parallel flow configuration might generally transversely align flow on the opposing faces by positioning corresponding first and second inlets at opposite sides of a first corner of the plate, and corresponding first and second outlets at opposite sides of a generally diametrically opposed second corner of the plate. Further, a counter flow design might provide flow in generally transversely opposite directions on the opposing faces by placing first inlet(s) and second outlet(s) at opposite sides of a first corner of the plate, and first outlet(s) and second inlet(s), respectively, at opposite sides of a generally diametrically opposed second corner of the plate. Moreover, perpendicular flow might entail flow channels on opposite sides of a plate oriented crosswise with respect to each other. Any variation(s), combination(s), and/or modification(s) of these concept(s) may be provided with any flow channel(s) and/or flow channel section(s).

Operation of a fuel cell assembly of the present invention can include periods or intervals of action and inaction, such as an active use followed by idling. Also, the fuel cell assembly can be employed for varied (e.g., automotive to aerospace to industrial to residential) applications, in various environments.

Numerous alternative embodiments of the present invention exist. Fluid flow plate 200 and/or fluid manifold(s) 150, 150' could serve any desired function with any appropriate orientation, shape, and/or formation in any position of fuel cell assembly 100. Further, fluid flow face 202 could easily have any number of flow channels 204. Any flow channel 204 could easily have any appropriate shape or structure. Also, flow channel(s) 204 could easily be configured to deviate, to any desired degree, from parallel alignment and/or serpentine design. Moreover, any of port(s) 206 and/or port(s) 208 might employ any mechanism for fluid communication between appropriate flow channel(s) 204 and fluid manifold(s) 150, 150'. Design choices permit variation in construction technique(s) and/or material(s) for any portion of fluid flow plate 200 and/or fuel cell assembly 100. Furthermore, fluid flow plate(s) 200 could easily be employed in any appropriate type(s) of fuel cell(s). Additionally, working section 114 could easily include any desired type(s) of fuel cell(s).

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for diminishing diffusion loss at relatively high current densities of a PEM fuel cell, said fuel cell having a membrane electrode assembly sandwiched between an anode fluid flow plate and a cathode fluid flow plate, with an anode gas diffusion layer intermediate the anode fluid flow plate and an anode side of the membrane electrode assembly, and a cathode gas diffusion layer intermediate the cathode fluid flow plate and a cathode side of the membrane electrode assembly, comprising the steps of:
   simultaneously supplying a fuel to the anode fluid flow plate for diffusion through the anode gas diffusion layer toward the anode side of the membrane electrode assembly, and an oxidant to the cathode fluid flow plate for diffusion through the cathode gas diffusion layer toward the cathode side of the membrane electrode assembly; and
   pulsating at least one of said simultaneously supplied fuel and oxidant to enhance mass transport through a gas diffusion layer of said fuel cell.

2. The method of claim 1 wherein said pulsating step comprises oscillating pressure of at least one of said simultaneously supplied fuel and oxidant.

3. The method of claim 2 wherein said pulsating step comprises oscillating pressure of the simultaneously supplied fuel and oxidant in phase.

4. The method of claim 2 wherein said pulsating step comprises oscillating pressure of one of said simultaneously supplied fuel and oxidant while maintaining pressure of the other of said simultaneously supplied fuel and oxidant substantially constant.

5. The method of claim 1 further comprising applying said pulsating to dynamically inflect said membrane electrode assembly.

6. The method of claim 2 wherein said oscillating pressure is applied to enhance mass transport of at least one of said fuel and said oxidant through said gas diffusion layer toward said membrane electrode assembly.

7. The method of claim 6 wherein said diffusion loss is at least partially attributable to inert gas blanketing, and said oscillating pressure enhances mass transport of said inert gas through said gas diffusion layer away from the membrane electrode assembly.

8. The method of claim 7 wherein said inert gas comprises at least one of nitrogen and carbon dioxide.

9. The method of claim 6 wherein at least one of: (a) said supplied fuel comprises reformate, and (b) said supplied oxidant comprises air.

10. The method of claim 6 wherein said oscillating pressure enhances mass transport of excess water through said gas diffusion layer away from the membrane electrode assembly.

11. The method of claim 10 wherein said excess water comprises at least one of product water and humidification fluid.

12. The method of claim 6 wherein said oscillating pressure is applied when said fuel cell is operating at high current density, resulting in enhanced power density of the fuel cell.

13. A method for diminishing diffusion loss at relatively high current densities of a PEM fuel cell, said fuel cell having a membrane electrode assembly sandwiched between an anode fluid flow plate and a cathode fluid flow plate, with an anode gas diffusion layer intermediate the anode fluid flow plate and an anode side of the membrane electrode assembly, and a cathode gas diffusion layer intermediate the cathode fluid flow plate and a cathode side of the membrane electrode assembly, comprising the steps of:
   simultaneously supplying a fuel to the anode fluid flow plate for diffusion through the anode gas diffusion layer toward the anode side of the membrane electrode assembly, and an oxidant to the cathode fluid flow plate for diffusion through the cathode gas diffusion layer toward the cathode side of the membrane electrode assembly; and
   dynamically inflecting said membrane electrode assembly to enhance mass transport through a gas diffusion layer of said fuel cell.

14. The method of claim 13 wherein said membrane electrode assembly is dynamically inflected to expel a discharge fluid from a gas diffusion layer of the fuel cell.

15. Fuel cell apparatus comprising:
   a PEM fuel cell having a gas diffusion layer located between a reactant fluid flow plate and a membrane electrode assembly; and
   a pulsator in fluid communication with a reactant fluid manifold of the fuel cell for pulsing pressure of a reactant fluid in said cell to cause enhanced mass transport through the gas diffusion layer of the fuel cell.

16. The apparatus of claim 15 wherein said pulsing pressure comprises oscillating pressure.

17. The apparatus of claim 16 wherein said enhanced mass transport comprises at least one of: (a) enhanced movement of an inert gas through the gas diffusion layer away from the membrane electrode assembly; (b) enhanced movement of excess water through the gas diffusion layer away from the membrane electrode assembly; and (c) enhanced movement of a reactant fluid through the gas diffusion layer towards the membrane electrode assembly.

18. The apparatus of claim 17 wherein said enhanced mass transport comprises: (a), (b) and (c).

19. The apparatus of claim 16, further comprising means for activating the pulsator when the fuel cell is operating at a high current density, resulting in enhanced power density.

20. The apparatus of claim 15 wherein said pulsator is in fluid communication with a reactant fluid exit manifold.

21. The apparatus of claim 15 wherein said pulsator comprises a solenoid in fluid communication with multiple flow regulators.

22. The apparatus of claim 15 wherein said pulsator comprises a displacement pump.

* * * * *

UNITED STATES PATENT AND TRADEMARK OFFICE
CERTIFICATE OF CORRECTION

PATENT NO. : 6,093,502
DATED : Jul. 25, 2000
INVENTOR(S) : Carlstrom, Jr. et al.

It is certified that error appears in the above-identified patent and that said Letters Patent are hereby corrected as shown below:

[57] ABSTRACT
line 20 after "inflect" delete "the MEA" and replace with --layer(s) of a fuel cell--

Column 13, line 49 delete "relatively"

Column 14, line 9 delete "while maintaining pressure" and insert --with no pressure oscillation--
Column 14, line 11 delete "substantially constant"

Column 14, line 40 delete "relatively"

Signed and Sealed this

Twenty-fourth Day of April, 2001

Attest:

NICHOLAS P. GODICI

Attesting Officer

Acting Director of the United States Patent and Trademark Office